(12) United States Patent
Ahmed et al.

(10) Patent No.: US 6,961,397 B2
(45) Date of Patent: Nov. 1, 2005

(54) SYMBOL SYNCHRONIZER FOR IMPULSE NOISE CHANNELS

(75) Inventors: Walid Ahmed, Eatontown, NJ (US); Juan G. Gonzalez, Wilmington, DE (US); Salim Manji, Edison, NJ (US); Jose Luis Paredes, Newark, DE (US)

(73) Assignee: Lucent Technologies Inc., Murray Hill, NJ (US)

( * ) Notice: Subject to any disclaimer, the term of this patent is extended or adjusted under 35 U.S.C. 154(b) by 741 days.

(21) Appl. No.: 09/903,881

(22) Filed: Jul. 12, 2001

(65) Prior Publication Data

US 2003/0012316 A1 Jan. 16, 2003

(51) Int. Cl.[7] .............................................. H04L 7/00
(52) U.S. Cl. ...................................... 375/354; 375/376
(58) Field of Search ................................ 375/267, 354, 375/366, 371, 376; 360/46; 704/211–213; 370/324, 503–514; 340/681

(56) References Cited

U.S. PATENT DOCUMENTS

| | | | |
|---|---|---|---|
| 4,578,800 A | * | 3/1986 | Yasuda et al. .............. 375/354 |
| 5,541,955 A | * | 7/1996 | Jacobsmeyer ............... 375/222 |
| 5,749,064 A | * | 5/1998 | Pawate et al. .............. 704/213 |
| 6,335,954 B1 | * | 1/2002 | Bottomley et al. ......... 375/354 |
| 6,483,885 B1 | * | 11/2002 | Bradley et al. ............ 375/366 |
| 6,657,802 B1 | * | 12/2003 | Ashley et al. ............... 360/51 |

OTHER PUBLICATIONS

Hassan et al., Parallel Decoding For Channels With Jamming, Oct. 11–14, 1992, Military Communications Conference Communications–Fusing Command, Control and Intelligence, IEEE, vol. 2, pg(s) 594–598.*

* cited by examiner

Primary Examiner—Amanda T. Le
Assistant Examiner—Lawrence B. Williams

(57) ABSTRACT

A symbol synchronizer comprises a distance metric computation module for computing a metric from received samples using a distance metric function within a symbol sampling period and based on a timing signal for each of the possible symbols in a constellation, a control signal computation module for selecting a smallest and a second smallest metrics, producing a difference by subtracting the smallest metric from the second smallest metric, and deriving a control signal from the difference, and a voltage-control clock for producing the timing signal based on the control signal.

20 Claims, 8 Drawing Sheets

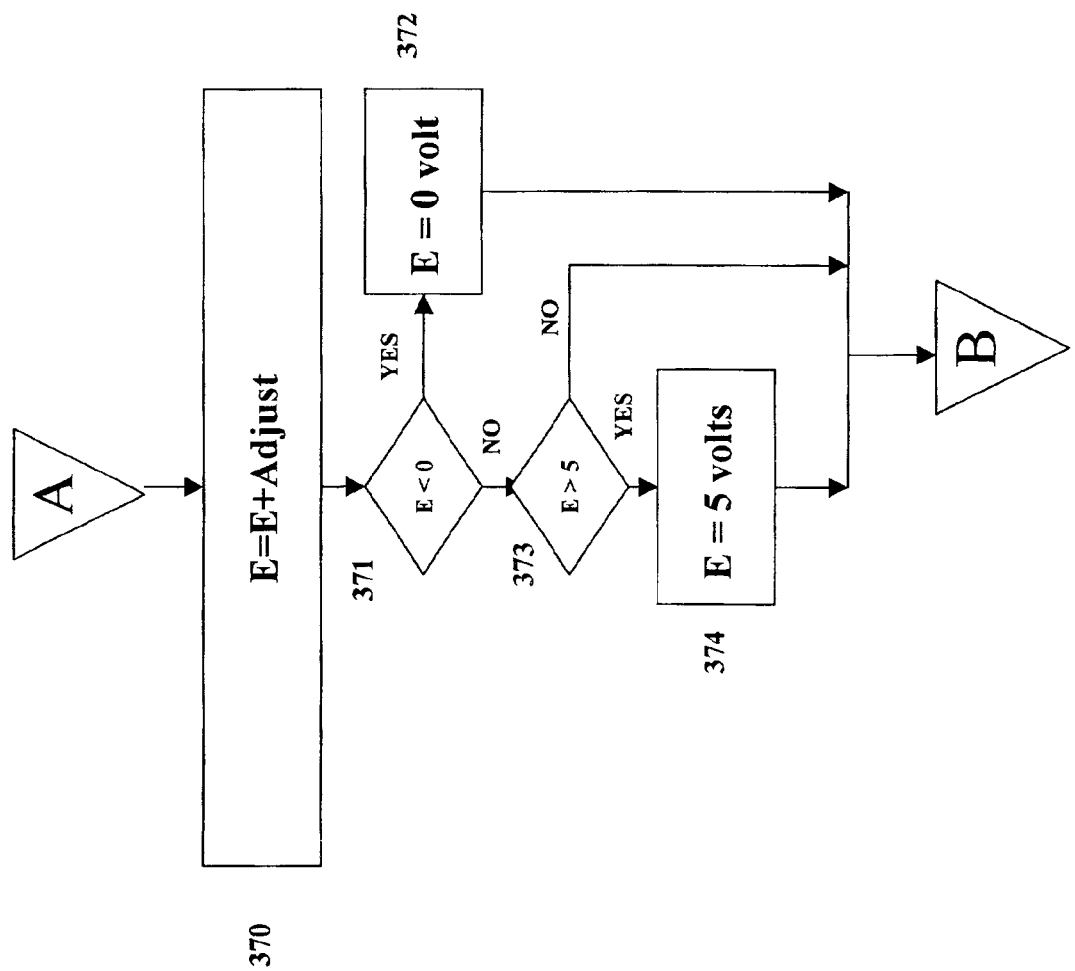

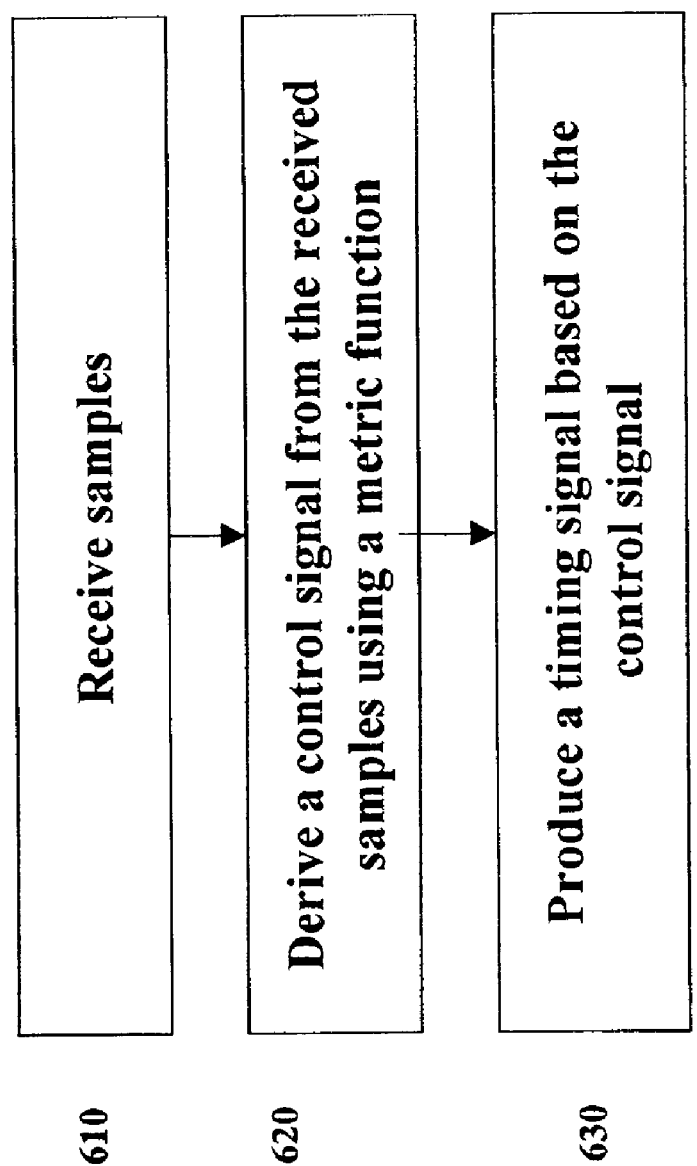

SYMBOL SYNCHRONIZER FOR IMPULSE NOISE CHANNELS

FIELD OF THE INVENTION

The present invention relates to data communication and, more particularly to synchronization.

BACKGROUND OF THE INVENTION

Symbol synchronization is one of the most critical receiver functions. When a receiver is not synchronized with the transmitter, the detected symbols are likely to be incorrect.

An important factor that affects the performance of a symbol synchronizer is the type of noise present in the communication channel connecting a transmitter and a receiver. In many applications such as wireless communications and underwater acoustic channels, the noise is known to be non-Gaussian. However, most of the known symbol synchronization techniques assume that the noise is Gaussian and, as such, may perform poorly or fail completely in the presence of non-Gaussian noise.

For example, one of the most common symbol synchronizers is the early-late gate symbol synchronizer. The underlying idea of an early-late gate symbol synchronizer is to exploit the symmetry properties of the signal at the output of a matched filter. (Note that a matched filter is generally used to maximize the signal-to-noise ratio of received signals.) Specifically, the early-late gate symbol synchronizer samples the output of the matched filter twice, once before (early) the supposed proper time and once after (late). Generally, the output of the matched filter exhibits a symmetry shape around the proper sampling time and if the sampling time is correct, the early and the late samples are the same. A phase-lock loop (PLL) checks for this fact and adjusts the timing signal accordingly. Unfortunately, the matched filter is generally an optimal detector for Gaussian noise communication channels, but in the presence of non-Gaussian noise, its output may not exhibit a symmetrical shape, which may cause the early-late gate symbol synchronizer to break down, i.e., produce a timing signal which is substantially out of synchronization with the transmitter.

SUMMARY OF THE INVENTION

The above problem is addressed by having a symbol synchronizer producing a timing signal based on a control signal which is derived from received samples by using a distance metric function.

An embodiment is a symbol synchronizer that comprises a distance metric computation module for computing a metric from received samples using a distance metric function within a symbol sampling period and based on a timing signal for each of the possible symbols in a constellation, a control signal computation module for selecting a smallest and a second smallest metrics, producing a difference by subtracting the smallest metric from the second smallest metric, and deriving a control signal from the difference, and a voltage-control clock for producing the timing signal based on the control signal.

BRIEF DESCRIPTION OF THE DRAWINGS

The present invention will be more fully appreciated from a consideration of the following Detailed Description, which should be read in light of the accompanying drawings in which:

FIG. 6 shows an illustrative flow chart for generating a timing signal in accordance with the principles of the invention.

DETAILED DESCRIPTION

Figure 1:
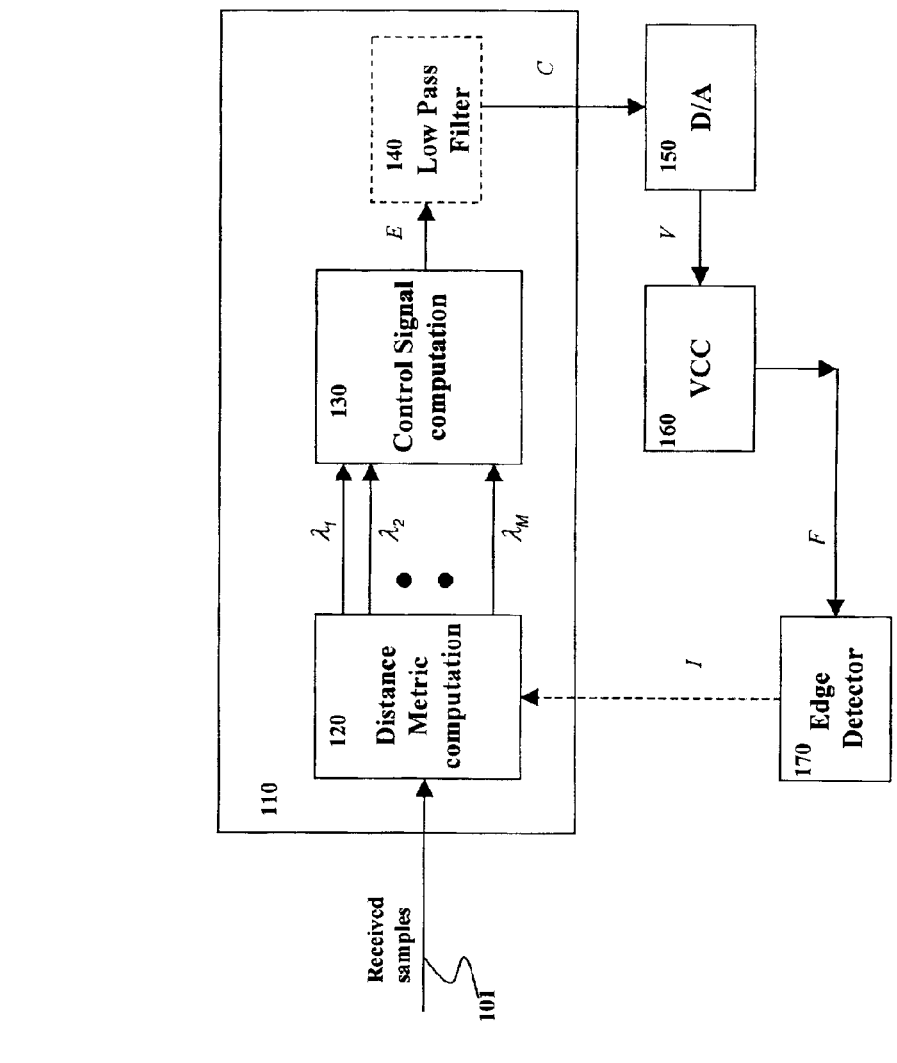
FIG. 1 shows an illustrative symbol synchronizer in accordance with the principles of the invention.

FIG. 1 shows an illustrative symbol synchronizer 100 in accordance with the principles of the invention. For illustration purposes, an M-point quadrature amplitude modulation (QAM) is used at the transmitter (not shown), i.e., there are M symbols in the constellation and, thus, there are M possible symbols to be detected by symbol synchronizer 100. Symbol synchronizer 100 comprises control signal generator 110, digital-to-analog (D/A) converter 150, voltage-control clock (VCC) 160, and edge detector 170.

Control signal generator 110 comprises distance metric computation module 120, control signal computation module 130, and optional low pass filter 140. The modules in control signal generator 110 are illustratively implemented as software in an Agere™ DSP16210 digital signal processor. Those modules can also be implemented in one or more digital signal processors (DSPs) or microprocessors, or in one or more application specific integrated circuits (ASICs). Distance metric computation module 120 receives samples from a sampler sampling input signals from a communication channel using a different clock signal than that of symbol synchronizer 100. (The sampler, the communication channel and the clock signal used by the sampler are not shown.) The sampler produces N (for example 8) samples for a given symbol period, T (for example 0.025 microseconds). Distance metric computation module 120 receives the N samples and stores the samples in a buffer (described below). When distance metric computation module 120 receives timing signal I from edge detector 170, it retrieves the current N samples from the buffer and computes a metric with respect to each of the M possible symbols in the constellation using the retrieved N samples and a distance metric function. Illustratively, timing signal I is connected to one of the four external interrupt pins of the Agere™ DSP16210, so that an external interrupt is provided, which causes the Agere™ DSP16210 to execute distance metric computation module 120.

In accordance with the principles of the invention, the M metrics, $\lambda_1$–$\lambda_M$, produced by distance metric computation module 120 are then passed to control signal computation 130, which generates control signal E (described below). When low pass filter is not activated, control signal E is the same as control signal C Control signal C is passed to digital-to-analog (D/A) converter 150 which converts control signal C into an analog DC (direct current) voltage V. D/A conversion is well known in the art and is not described herein. Optionally, when low pass filter 140 is activated, control signal E is converted to control signal C by low pass filter 140. Low pass filter 140 reduces the effect of a sudden occurrence of an unusual large noise and has memory to save previous values of control signal C. Illustratively, low pass filter 140 averages the current control signal E and the past three values of control signal E to produce control signal C. Other low pass filters can be used as well. For example, more past values and unequal weights can be used in implementing the low pass filter.

The analog DC voltage V generated by D/A converter 150 is the input control voltage to voltage-controlled clock (VCC) 160. Based on the value of V, VCC produces an output frequency F. It should be noted that the center frequency produced by VCC 160 should have a period equal to the symbol timing period T. VCCs are well known In the art and are not described herein. For example, the VO4OMEO1 VCC produced by Z-Communications, Inc. has a control voltage range of 0–5 Vdc (Volts DC) and has an output frequency range of 38–41 MHz (Megahertz). Edge detector 170, then, detects the rising edge of each cycle of the output frequency F and generates a timing (interrupt) signal I which is received by distance metric computation module 120 as described above. Detecting a rising edge of a wave is known in the art and is not described herein.

Figure 2:
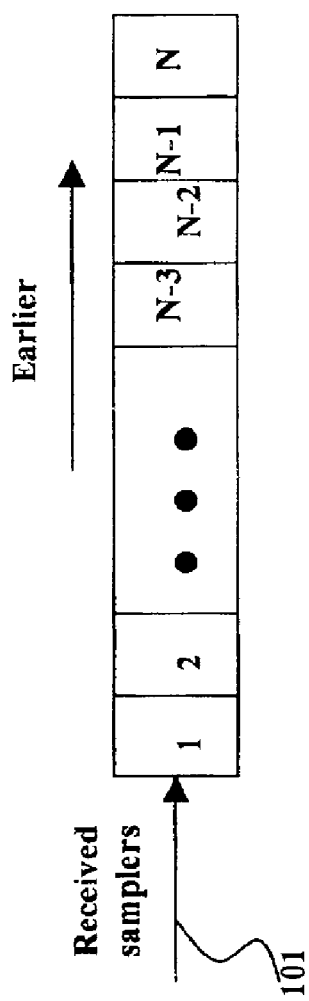
FIG. 2 shows an illustrative FIFO queue in the distance metric computation module in FIG. 1.

FIG. 2 shows an example of the buffer used by distance metric computation module 120. Illustratively, the buffer is a FIFO (first-in-first-out) queue. When a new (the latest) sample arrives, the FIFO is shifted right for one position. As a result, the sample at position N is discarded and position 1 is used to store the newly arrived sample To help understand the description below, the principles of the invention are briefly described A distance metric function, $\rho(x)$, is used to measure the distance between a received signal and each of the M possible symbols in the constellation, $\beta_1, \beta_2, \ldots, \beta_M$. As mentioned above, N samples are produced for each symbol timing period, T. Thus, each received signal is sampled N times. Ideally, if the receiver is perfectly synchronized with the transmitter in a noise free environment, all N samples should fall into the same symbol in the constellation and the distance from each of the N samples to the symbol as measured by the distance metric function, $\rho(x)$, should be zero. In the real world, synchronization is not perfect and generally, the symbol that has the minimum total distance to all N samples is selected by a receiver as the symbol sent by the transmitter. The total distance to all N samples with respect to a symbol is called a metric with respect to that symbol. For simplicity, with respect to symbol $\beta_j$, the metric is denoted as $\lambda_j$. Denoting the N received samples as $r_1, r_2, \ldots, r_N$, $\lambda_j$ is calculated as follows:

$$\lambda_j = \sum_{i=1}^{N} \rho(r_i - \beta_j) \tag{1}$$

It is observed that if synchronization is perfect and the signal transmitted is $\beta_j$, then $\lambda_j$ should be zero and should be the smallest among all metrics. That is, if the synchronization is perfect, the difference between any other metric and $\lambda_j$ should be large. In accordance with the principles of the invention, the difference between a second smallest metric and the smallest metric is used to adjust the system timing, such that the difference is maximized and thus the best synchronization is achieved.

Both Euclidean and non-Euclidean distance metric functions can be used. Examples of Euclidean and non-Euclidean distance metric functions are respectively shown in Eqs. (2) and (3).

$$\rho(x) = x^2 \tag{2}$$

$$\rho(x) = \begin{cases} x^2 & \text{for } -k < x < k \\ k^2 & \text{otherwise} \end{cases} \tag{3}$$

Figure 3A:
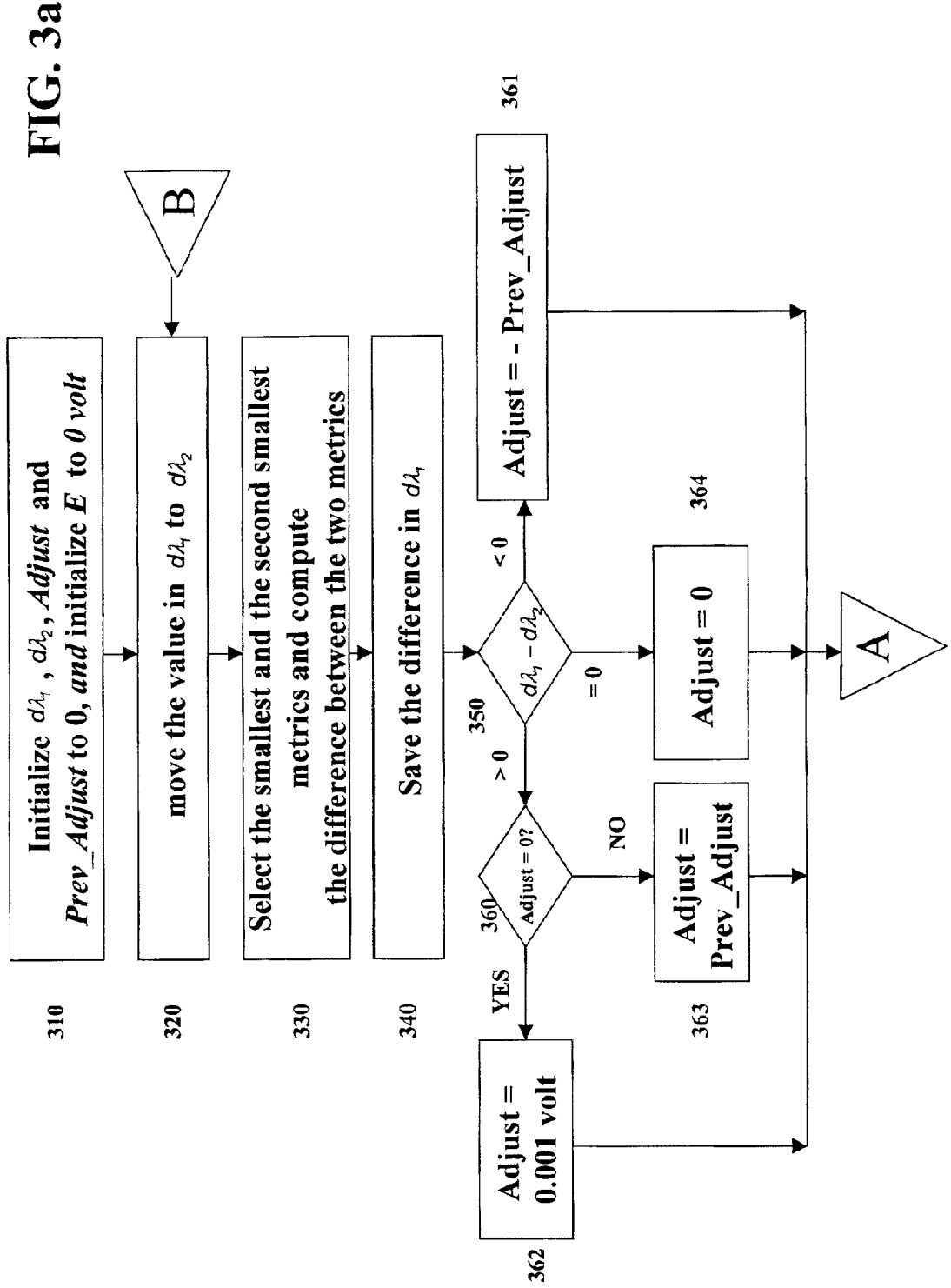
FIG. 3 shows an illustrative flow chart for generating the control signal in the control signal computation module in FIG. 1.

Refer now to FIG. 3a where an illustrative flow chart explaining the operation of control signal computation module 130 which uses the difference between a second smallest and the smallest metric to derive control signal E. Two variables, $d\lambda_1$ and $d\lambda_2$, respectively representing the current difference and past difference are created and initialized to 0 at block 310. Another two variables, Adjust and Prev_Adjust, respectively representing the current and previous control signal adjustment values are created and initialized to 0 at block 310. In addition, control signal E is initialized to 0 volt at block 310. It should be noted that block 310 is executed once after the start of the operation of the synchronizer, for example, after power-up of the DSP. At block 320, the value in $d\lambda_1$ is moved to $d\lambda_2$, so that the past difference is saved. At block 330, the smallest and the second smallest metrics are selected and the current difference is computed, and, at block 340, the current difference is stored in $d\lambda_1$. At decision block 350, $d\lambda_1$ is compared to $d\lambda_2$. If $d\lambda_1$ is smaller, which indicates that the previous adjustment is in the wrong direction, the adjustment direction is reversed at block 361. If $d\lambda_1$ and $d\lambda_2$ are equal, which indicates that synchronization has been achieved, no adjustment is needed and Adjust is set to 0 at block 364. If $d\lambda_1$ is larger, the previous adjustment direction (the sign of the value of Prev_Adjust) is correct and the program proceeds to decision block 360 which checks if an adjustment direction has been given by checking if Adjust is equal to 0. If Adjust is not 0, the adjustment direction has been given, no change in adjustment is needed and Adjust is set to the value of Prev_Adjust. Otherwise, a direction is set at block 362. Illustratively, Adjust is set to 0.001 volt. It should be noted that Adjust can be set to other values. For example, Adjust can be set to a higher value to get a quicker response. Adjust does not have to be a constant. For example, Adjust can be set according to a function of $d\lambda_1 - d\lambda_2$, so that the larger the difference, the larger the adjustment is made.

At this point, the current value of the adjustment, Adjust, has been determined The program then continues to the control signal adjustment section on FIG. 3b. At block 370, control signal E is adjusted by adding the value of Adjust to the previous value of control signal E. In the illustration, the VCC has an input control voltage range of 0 to 5 volts and E is limited to that range. This is achieved through blocks 371–374. Blocks 371 and 372 make sure that E is not smaller than 0 volt, and blocks 373 and 374 ensure that E is not greater than 5 volts. The program then goes back to block 320 for handling the next M metrics generated in the next symbol timing period.

Figure 4:
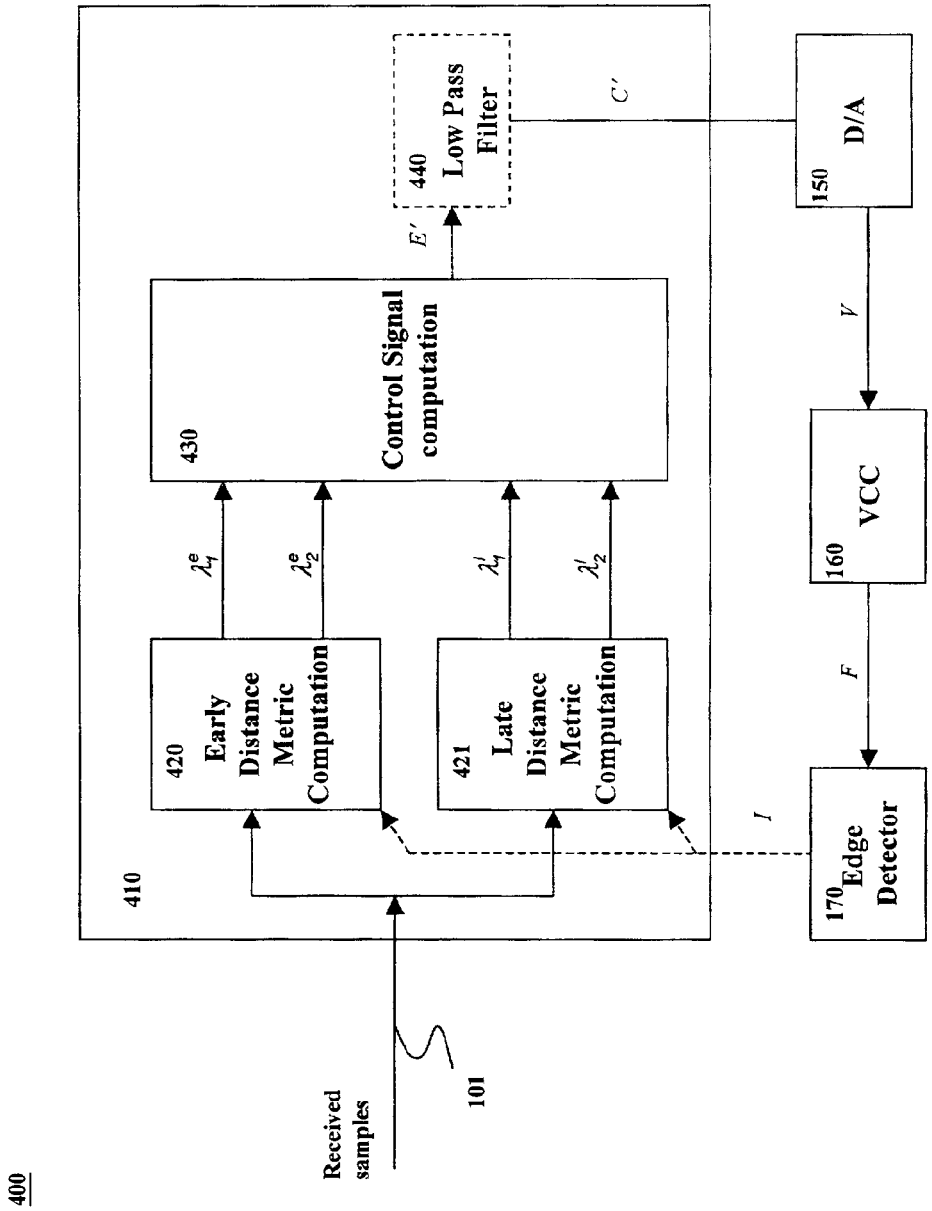
FIG. 4 shows another illustrative symbol synchronizer in accordance with the principles of the invention.

Refer now to FIG. 4 where another illustrative embodiment of the principles of the invention is shown. This embodiment is an example of implementing an early-late gate symbol synchronizer in accordance with the principles of the invention. For illustration purposes, a modulation method that produces two symbols, such as BPSK (binary phase shift keying), is used in the symbol synchronizer shown in FIG. 4. Thus, there are only two symbols in the constellation. Symbol synchronizer 400 comprises control signal generator 410, D/A converter 150, VCC 160 and edge detector 170. D/A converter 150, VCC 160, and edge detector 170 are the same as those in FIG. 1 and will not be described herein. Control signal generator 410 comprises early distance metric computation module 420, late distance metric computation module 421, control signal computation module 430, and optional low pass filter 440. The optional low pass filter 440 is the same as in FIG. 1 and is not described herein. Like control signal generator 110 in FIG. 1, the modules in control signal generator 410 are illustratively implemented as software in an Agere™ DSP16210 digital signal processor. They can be implemented in one or more digital signal processors or microprocessors, or in one or more ASICs. Both early and late distance metric computation modules 420 and 421 store received samples 101 in their respective buffers. As described before and for illustration purposes, N samples are produced for a given symbol period T. Illustratively, late distance metric computation module 421 uses a buffer like the one in FIG. 2 and computes the two late distance metrics using all N samples for each arrival of timing signal I from edge detector 170. Early distance metric computation module 420 computes two early metrics from earlier N samples for each arrival of timing signal I. Illustratively, there are P (for example P=N/2) samples apart from the latest sample in the earlier N samples used by early distance metric computation module 420 to the earliest sample in the N samples used by late distance metric computation module 421. Thus, early distance metric computation module 420 illustratively allocates a buffer similar to that in FIG. 2 but the buffer has the size of 2N+P samples. The earlier N samples, i.e., from location P+N+1 to 2N+P, are used for calculating the early metrics. According to the principles of the invention, if the synchronization is perfect, the early and late sampling times are symmetric with respect to the ideal sampling time and the smallest metric among the early metrics should be the same as that among the late metrics. Similarly, if the synchronization is perfect, the difference, $\Delta\lambda^e$, between a smallest metrics, $\lambda_{min}^e$, and a second smallest metric, $\lambda_k^e$, where min≠k, among the early metric set should be the same as the difference, $\Delta\lambda^l$, between a smallest metrics, $\lambda_{min}^l$, and a second smallest metric, $\lambda_m^l$, where min≠m. Thus, both $\lambda_{min}^e - \lambda_{min}^l$ and $\Delta\lambda^e - \Delta\lambda^l$ can be used to derive the control signal.

Figure 5A:
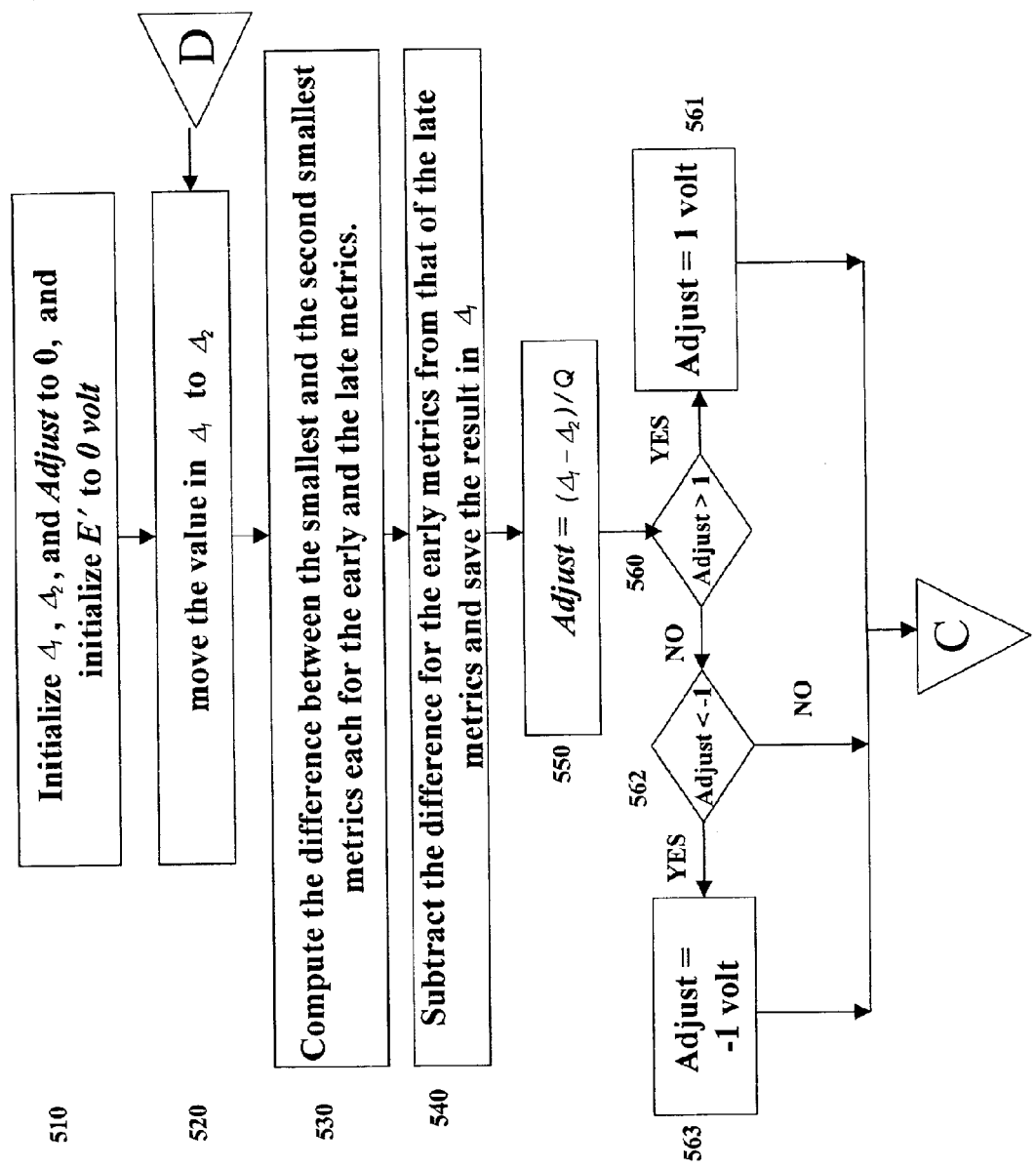
FIG. 5 shows an illustrative flow chart for generating the control signal in the control signal computation module in FIG. 4.

FIG. 5 shows an illustrative flow chart used by control signal generator 410, where $\Delta\lambda^e - \Delta\lambda^l$ is used to derive the control signal E'. At block 510, two variables, $\Delta_1$ and $\Delta_2$ respectively representing the current and past values of $\Delta\lambda^e - \Delta\lambda^l$ are initialized to 0. Variable Adjust representing the adjustment value is also initialized to 0 and variable E' representing the control signal is initialized to 0 volt. At block 520, the value in $\Delta_1$ is moved to $\Delta_2$, so that the past value of $\Delta\lambda^e - \Delta\lambda^l$ is saved in $\Delta_2$. Block 530 computes the current values of $\Delta\lambda^e$ and $\Delta\lambda^l$, and, at block 540, the new value of $\Delta\lambda^e - \Delta\lambda^l$ is computed and saved in $\Delta_1$. At block 550, the value of $\Delta_1 - \Delta_2$ is normalized with Q, where Q has a value of half the distance between the two symbols in the constellation using the same distance metric function. Other value of Q can be chosen to affect the responsiveness of the adjustment. For example, if Q is larger, the normalized value is more difficult to go above 1 at decision block 560 and below −1 at decision block 562. Consequently, the maximum adjustment is more difficult to reach at either block 561 or 563, and thus the response is slower. In the example, the maximum adjustment is limited to 1 volt. Other values can be used as well as long as they are smaller than the input voltage range to the VCC, which in this example is 5 volts.

Figure 5B:
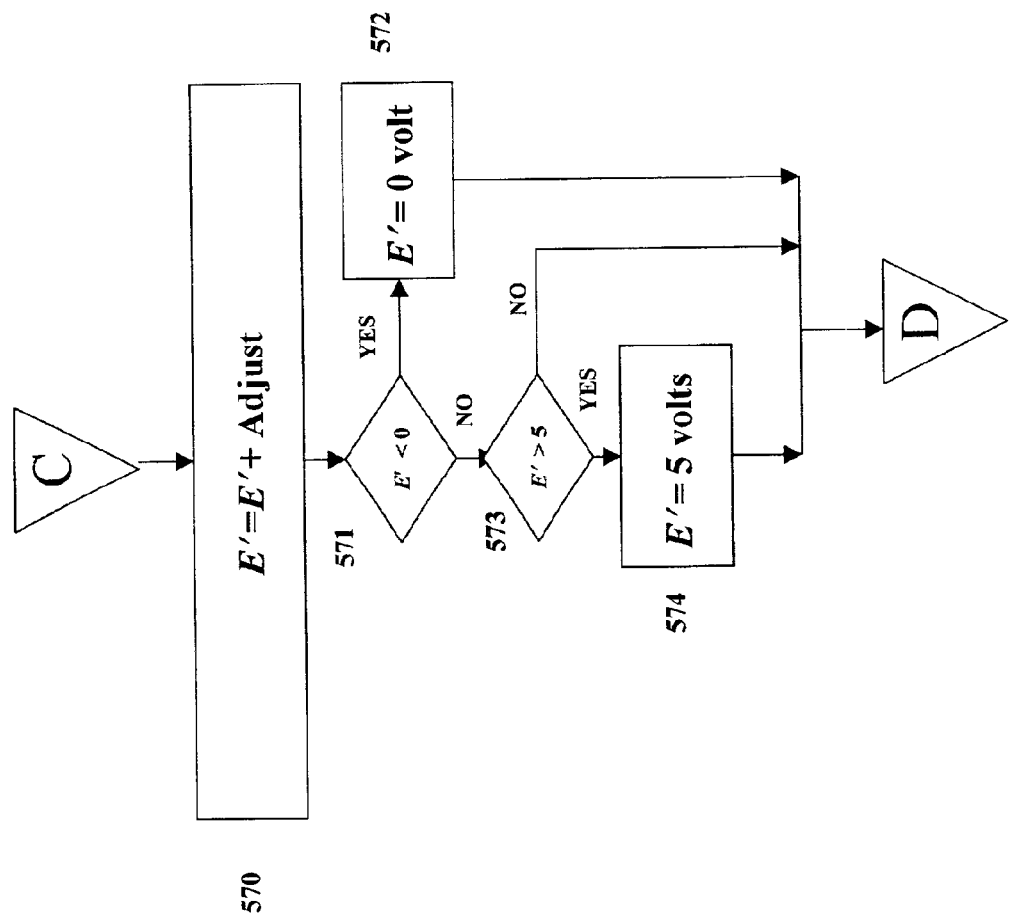

Once the adjustment, Adjust, is determined, the control signal E' is adjusted by Adjust at block 570 in FIG. 5b. Blocks 571–574 in FIG. 5b serve the same function as blocks 371–374 in FIG. 3b, and their functions are not repeated here. The process is repeated from block 520 at the next symbol cycle.

It should be noted that other modulation methods can be used as well such as QAM, quadrature phase shift keying (QPSK), and pulse amplitude modulation (PAM). However, if the distance between any two symbols in the constellation is not a constant, $\lambda_{min}^e - \lambda_{min}^l$ should be used to derive the control signal.

Referring now to FIG. 6, an illustrative flow chart for producing a timing signal in accordance with the principles of the invention is shown. At block 610, samples are received as described above. At block 620, a control signal is derived from the received samples using a distance metric function, such as those shown in FIGS. 3 and 5. Finally, a timing signal is produced based on the control signal. For example, D/A 150, VCC 160, and edge detector 170 in FIG. 1 together produce the timing signal I from control signal C.

A symbol synchronizer other than those disclosed can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention.

What is claimed is:

1. A symbol synchronizer comprising:
   (a) means for deriving a control signal from received samples using a distance metric function; and
   (b) timing adjustment means for producing a timing signal based on the control signal where the distance metric function is denoted as $\rho(x)$, and is defined as follows:

$$\rho(x) = x^2,$$

where x is related to a distance between a received sample and each possible symbol in a constellation.

2. The symbol synchronizer of claim 1 wherein the distance metric function is non-Euclidean.

3. The symbol synchronizer of claim 2 wherein the distance metric function, denoted as $\rho(x)$, is further defined as follows:

$$\rho(x) = \begin{cases} x^2 & \text{for } -k < x < k \\ k^2 & \text{otherwise} \end{cases}$$

where k may be integer.

4. The synchronizer of claim 1 wherein the deriving means further comprises first distance metric computation means for computing a first set of metrics from first N consecutive received samples using the distance metric function with respect to all possible symbols.

5. The symbol synchronizer of claim 4 wherein the control signal is derived from a first difference obtained by subtracting a smallest metric from a larger metric among the first set of metrics.

6. The symbol synchronizer of claim 5 wherein the larger metric is a second smallest metric in the first set of metrics.

7. The symbol synchronizer of claim 5 wherein denoting current and past first differences as $d\lambda_1$ and $d\lambda_2$, the control signal is derived from the value of $d\lambda_1 - d\lambda_2$.

8. The symbol synchronizer of claim 4 wherein the deriving means further comprises second distance metric computation means for computing a second set of metrics from second N consecutive received samples using the distance metric function, wherein there are P samples apart from the latest sample in the first N consecutive received samples to the earliest sample in the second N consecutive received samples and P<N.

9. The symbol synchronizer of claim 8 wherein denoting the smallest metrics among the first and second sets of metrics as $\lambda_{min}^1$ and $\lambda_{min}^0$. respectively, the control signal is derived from the value of $\lambda_{min}^{0} - \lambda_{min}^{1}$.

10. The symbol synchronizer of claim 8 wherein denoting the difference between the smallest and the second smallest metrics among the first set of metrics as $\Delta\lambda^1$ and that among the second set of metrics as $\Delta\lambda^0$, the control signal is derived from the value of $\Delta\lambda^0 - \Delta\lambda^1$.

11. A method for synchronizing a communication channel, comprising the steps of:
   (a) receiving samples;
   (b) deriving a control signal from the received samples using a distance metric function; and
   (c) producing a timing signal based on the control signal where the distance metric function is denoted as $\rho(x)$, and is defined as follows:

$$\rho(x) = x^2$$

where x is related to a distance between a received sample and each possible symbol in a constellation.

12. The method of claim 11 wherein the distance metric function is non-Euclidean.

13. The method of claim 12 wherein the distance metric function, denoted as $\rho(x)$, is defined as follows:

$$\rho(x) = \begin{cases} x^2 & \text{for } -k < x < k \\ k^2 & \text{otherwise} \end{cases}$$

where k may be an integer.

14. The method of claim 11 wherein step (b) further comprises the step of computing a first set of metrics from first N consecutive received samples using the distance metric function with respect to all possible signal constellations.

15. The method of claim 14 wherein the control signal is derived from a first difference obtained by subtracting a smallest metric from a larger metric among the first set of metrics.

16. The method of claim 15 wherein the larger metric is a second smallest metric in the first set of metrics.

17. The method of claim 15 wherein, denoting current and the past first differences as $d\lambda_1$ and $d\lambda_2$, the control signal is derived from the value of $d\lambda_1 - d\lambda_2$.

18. The method of claim 14 wherein step (b) further comprises the step of computing a second set of metrics from second N consecutive received samples using the distance metric function, wherein there are P samples apart from the latest sample in the first N consecutive received samples to the earliest sample in the second N consecutive received samples and P<N.

19. The method of claim 18 wherein denoting the smallest metrics among the first and second sets of metrics as $\lambda_{min}^1$ and $\lambda_{min}^0$, respectively, the control signal is derived from the value of $\lambda_{min}^0 - \lambda_{min}^1$.

20. The method of claim 18 wherein denoting the difference between the smallest and the second smallest metrics among the first set of metrics as $\Delta\lambda^1$ and that among the second set of metrics as $\Delta\lambda^0$, the control signal is derived from the value of $\Delta\lambda^0 - \Delta\lambda^1$.

* * * * *